No. 897,375. PATENTED SEPT. 1, 1908.
G. B. KELLY.
PEDAL MECHANISM.
APPLICATION FILED FEB. 11, 1908.
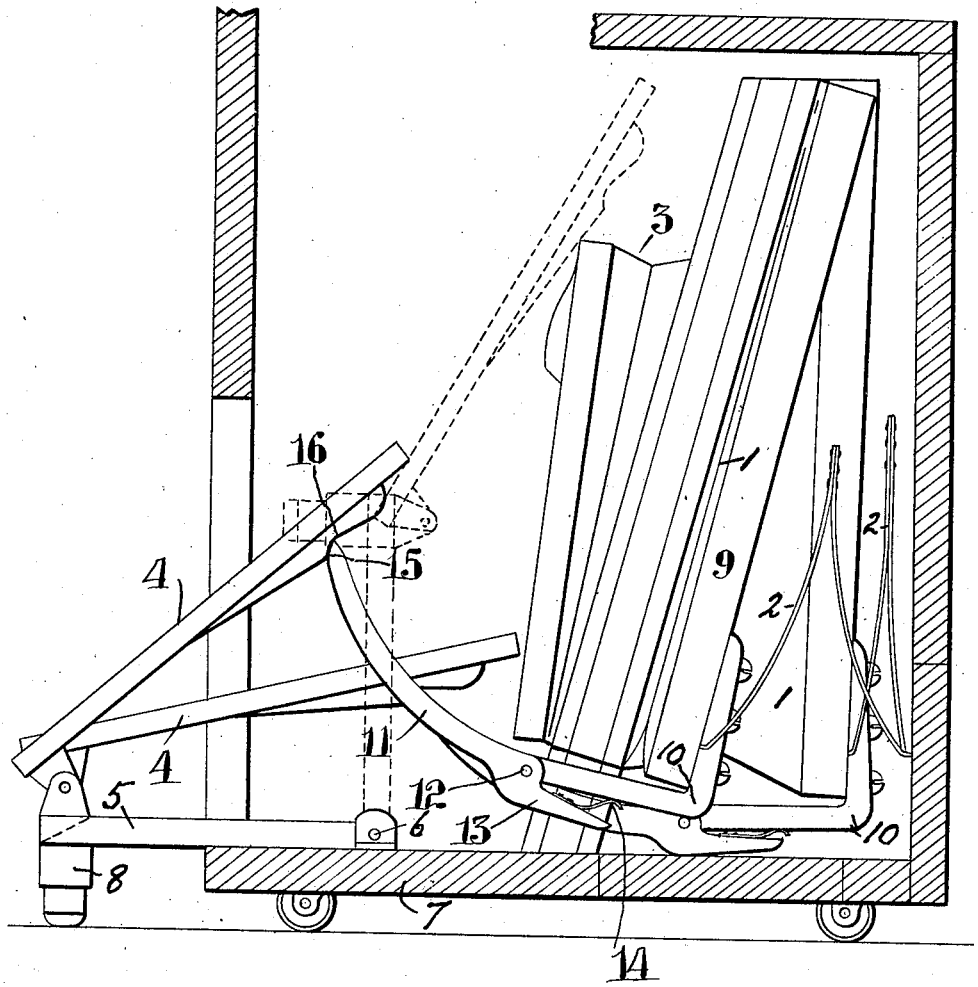

UNITED STATES PATENT OFFICE.

GEORGE B. KELLY, OF JAMAICA PLAIN, MASSACHUSETTS.

PEDAL MECHANISM.

No. 897,375.　　　　　Specification of Letters Patent.　　　Patented Sept. 1, 1908.

Application filed February 11, 1908. Serial No. 415,288.

*To all whom it may concern:*

Be it known that I, GEORGE B. KELLY, a citizen of the United States, and a resident of Jamaica Plain, in the county of Suffolk and State of Massachusetts, have invented certain new and useful Improvements in Pedal Mechanisms, of which the following is a specification.

This invention relates to a pedal mechanism and particularly to a pedal mechanism used for operating air pumping bellows such as are provided in pneumatical playing attachments for musical instruments.

The object of my invention is to provide a new and improved pedal mechanism for this purpose, which is simple in construction, effective in use and so constructed as not to produce any noises which would or could interfere with the music produced.

In the accompanying drawings, a side elevation of my improved pedal mechanism is shown in connection with the pumping and storage bellows and the lower part of the casing containing the mechanism.

The pumping bellows 1, of which there are usually two in an instrument, are of conventional construction and provided with spring 2—2, which tend to collapse these bellows. These pumping bellows exhaust the air from the storage bellows 3 also of conventional construction. The pedals 4 are pivotally mounted on a frame 5 pivoted at 6 in the casing 7 of the instrument which frame can be swung within the casing when the pedals are not to be used or can be swung out, as shown, for use of the pedals, this frame being provided at its outer end with a support 8. To the movable board 9 of each pumping bellows 1 an angle piece 10 is secured in such a manner that one arm of the angle piece, projects beneath the bottom edge of the movable board toward the front of the casing and to the forward end of the lower member of the angle bar, the push bar 11 is pivoted at 12 which push bar 11 is provided with an extension 13 beneath the lower arm of the angle bar 10. A spring 14 attached to the extension 13 is interposed between this extension and the bottom edge of the lower part of the angle bar and serves to press down the extension, thereby pressing the forward end of the push bar 10 upward. This forward end of the push bar is tapered to form a rounded edge 15 which rests in a notch 16 formed on the underside of the pedal 4. As the pedals are forced down they push backward and downward the push bars 11 which in turn force the movable board 9 of each bellows toward the rear thereby expanding the bellows and drawing the air out of the storage bellows 3. When the pedals are released, the springs 2 collapse the bellows and so on. As the pedals are swung down the angle of inclination of the push bars 11 to the pedals is greatly changed and the substantial knife edge ends of the push bars in the notch 16 permit of such changes without making use of a pivot and without undue friction or the possibility of creating any disturbing noises. As the push bars 11 are swung to the rear and downward their extensions 13 are moved toward the bottom edges of the angle pieces 11 and as the movable boards of the bellows are forced to the front by the expanding springs 2, the push bars 11 are moved upward and forward and at the same time their extensions 13 are forced down by the corresponding springs 14 to compensate for the movement of the push bars in relation to the pedals and preventing the push bars from working out of the proper position in relation to the pedals.

When the pedals are not required the pedal frame 5 is swung into the casing into upright position, the pedals projecting upward from the same, as shown in dotted lines. When the pedals are to be used, the frame 5, is swung downward and outward and the pedals slide along the free ends of the push bars 11 until the knife edge ends 15 of the push bars 11 reach the notches 16 in the pedals in which they pass whereupon the pedals can be used for pumping.

Having described my invention what I claim as new and desire to secure by Letters Patent is:—

1. The combination with a pedal and a bellows, of a push bar pivotally connected with the bellows and having an extension beyond its pivotal connection, a spring bearing on the extension, the forward end of the push bar being in contact with the pedal, substantially as set forth.

2. The combination with a pedal and a bellows, of an angle bar secured to the bottom part of the movable board of the bellows, a push bar pivoted to the bottom member of the angle bar and having an extension beyond its pivot, a spring interposed between said extension and the angle bar, the forward end of the push bar resting loosely in a notch of the pedal, substantially as set forth.

Signed at New York city in the county of New York and State of New York this 29th day of January A. D. 1908.

GEORGE B. KELLY.

Witnesses:
J. F. MEADE,
D. C. HEINS.